Figure 1:
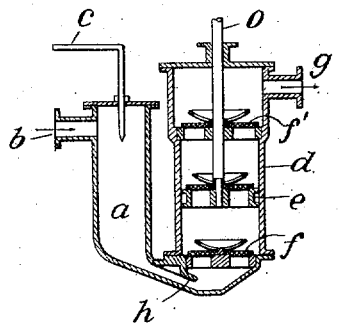

F. V. SCHIODT.

APPARATUS FOR THE EXTRACTION OF DUST FROM CARPETS AND OTHER ARTICLES.

APPLICATION FILED OCT. 20, 1915.

Reissued Dec. 7, 1915.

14,029.

2 SHEETS—SHEET 1.

Frederik Vilhelm Schiødt Inventor

By his Attorneys
Marvin & Swearton.

F. V. SCHIODT.

APPARATUS FOR THE EXTRACTION OF DUST FROM CARPETS AND OTHER ARTICLES.

APPLICATION FILED OCT. 20, 1915.

Reissued Dec. 7, 1915. 14,029.

2 SHEETS—SHEET 2.

Frederik Vilhelm Schiødt Inventor

By his Attorneys

Merwin & Swenarton

UNITED STATES PATENT OFFICE.

FREDERIK VILHELM SCHIÖDT, OF COPENHAGEN, DENMARK, ASSIGNOR, BY MESNE ASSIGNMENTS, TO PATENTS SELLING & EXPORTING CO. AKTIESELSKAB, OF COPENHAGEN, DENMARK.

APPARATUS FOR THE EXTRACTION OF DUST FROM CARPETS AND OTHER ARTICLES.

14,029. Specification of Reissued Letters Patent. Reissued Dec. 7, 1915.

Original No. 854,670, dated May 21, 1907, Serial No. 258,719. Application for reissue filed October 20, 1915. Serial No. 57,005.

*To all whom it may concern:*

Be it known that I, FREDERIK VILHELM SCHIÖDT, engineer, a subject of the King of Denmark, residing at Copenhagen, Denmark, (whose postal address is Forhaaleningsholm Allé 3, Copenhagen,) have invented new and useful Improvements in or Relating to Apparatus for the Extraction of Dust from Carpets and other Articles, of which the following is a specification.

My invention relates to apparatus for extracting dust and other impurities from carpets, furniture and the like and aims to provide certain improvements therein. As usually constructed, devices of this character comprise a suitable suction pump or other air exhausting apparatus adapted to produce a vacuum, and a suitable mouth piece or suction nozzle adapted to be passed over the surface of the article to be cleaned, a flexible pipe being interposed between the suction nozzle and the pump. When the dust-laden air is passed directly through the pump, the valves and pistons of the latter soon become leaky, partly on account of the wear caused by the dry dust, and partly on account of the accumulation of dust in the cylinder and valves. A further result is that the dust adheres to the oiled cylinder walls thus materially increasing the friction of the piston. To avoid these several disadvantages it has been proposed to interpose a filter or dust collector between the suction mouth piece and the pump so that the dust is filtered out of the air before the latter reaches the pump, the dust being removed at intervals from the collector. This construction has, however, had the disadvantage that the accumulation of dirt in the filters or collectors has caused a considerable loss in the vacuum produced by the pump. As the effective extraction of dust is entirely dependent upon the degree of vacuum which can be obtained at the mouth piece, such construction has not been efficient in practice.

By my invention I avoid these several disadvantages and obtain greater vacuum for a given expenditure of power than has heretofore been possible.

According to my invention I introduce into the apparatus a supply of water or other fluid, the point at which said supply is introduced being such that the pump instead of acting upon the dry dust-laden air, acts to pump the water and air simultaneously. The effect of introducing the water is to form the dust into a slime, which the pump acts to remove from the apparatus.

My invention embodies certain other improvements which will be hereafter referred to.

In order that my invention may be more clearly understood, I will proceed to describe the same with reference to the accompanying drawings, in which—

Figure 2:
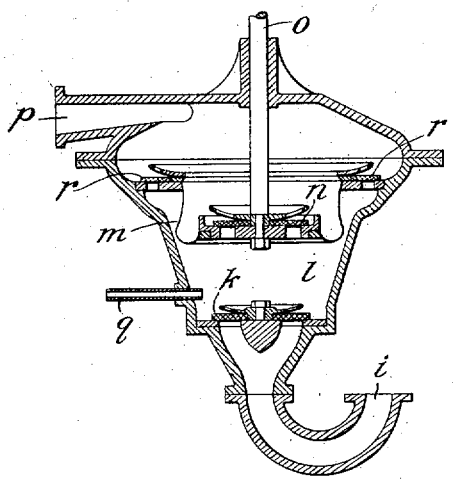
Figure 3:
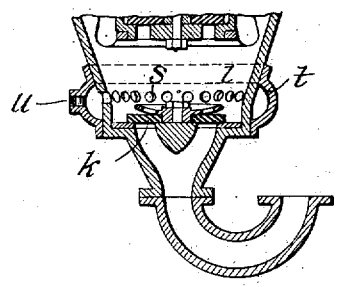
Figure 3:
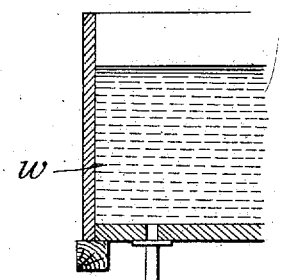
Figure 4:
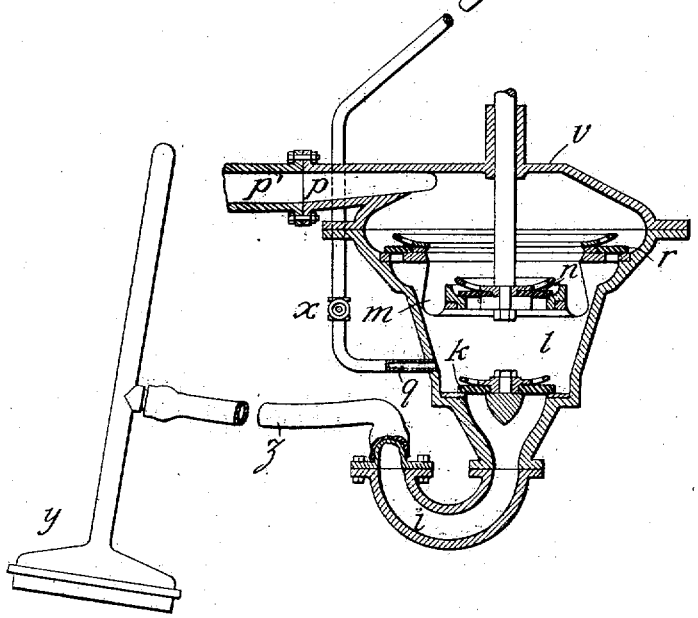

Figure 1 is a central vertical section of one construction of apparatus embodying my invention. Fig. 2 is a similar section showing another construction of such apparatus. Fig. 3 is a similar section of the lower part of the apparatus of Fig. 2 illustrating a modification. Fig. 4 is a sectional view illustrating in somewhat diagrammatic form a complete suction cleaning apparatus involving my invention.

Referring to Fig. 1, *a* is a chamber into which the dust-laden air is conveyed from the suction mouth piece through the usual flexible pipe or hose, the latter being connected with an inlet *b* shown as formed at the upper part of said chamber *a*. The water or other fluid is introduced into the chamber *a* through a pipe *c* preferably through a sprinkler, spreading nozzle or the like. The dust carried with the air is thus absorbed and mixed with the fluid at the bottom of the chamber *a*. The bottom of the chamber *a* is in communication with the lower part of the pump, which latter may be a so-called wet air pump that is to say, capable of taking water and air simultaneously. In the construction shown, *e* is a piston provided with a valve or valves, and *f f'* are the inlet and outlet valves respectively. *g* is the discharge outlet of the pump and *h* is a partition arranged at the lower part of the pump rendering it certain that the pump operates on both the air and water or other fluid at the same time.

In operation the pump produces the necessary vacuum, efficiently removing the air and dust, the latter being suspended in the liquid and discharged through the outlet *g*, into a sewer for instance; or if it is desired to use the liquid repeatedly, it may be passed into a filter, centrifugal machine or other purifying device, the purified liquid being returned to the pump.

It will be understood that a relatively large quantity of water should be introduced into the apparatus, so as to obtain a thorough sliming of the dust. Such quantity of water, however, must not be so large as to reduce the efficiency of the pump so far as its capability of pumping the air is concerned to such an extent as to break the vacuum. This might be done if the water was inadvertently introduced so rapidly as to maintain the pump chamber full, in which case the pump would act substantially entirely upon the water. It is essential, however, that the water be introduced in relatively large quantities so that after it has taken up the dust it will be in a sufficiently fluid state to be easily acted upon by the pump. The latter hence constitutes in effect a combined liquid and air pump which continuously or substantially continuously discharges the dust laden fluid and the dust free air from the apparatus.

By the device just described, as the dust is suspended in the water or other liquid, the valves and piston of the pump are not subjected to the excessive wear incurred when the pump is acting upon the dry dust, and as such valves and piston are constantly wet, they are easily maintained tight, which is difficult in the case of a dry air pump. The vacuum produced by the present apparatus is much higher than that produced by a dry air pump, partly because the valves and piston remain tight, and partly because in my device there is an absence of clearance behind the piston, which clearance is present in the dry air pumps formerly used. Furthermore there are no accumulations of dust in the pump cylinder to interfere with the movements of the piston and valves. As compared with those systems in which screens or filters are used in advance of the pump, my invention shows a decided gain in efficiency, principally because there is no loss of vacuum in advance of the pump, due to accumulations of dust in said filters or screens.

The fluid may be introduced into the apparatus through the pipe *c*, either by external pressure, or by the suction action of the vacuum in the chamber *a*.

Instead of utilizing a single mixing chamber, several such chambers may be employed in connection with a single pump, or vice versa. In the drawings the chamber *a* is shown immediately adjoining the pump, but it may be interposed at any other point in the conduit between the suction mouth piece and the pump. By arranging the chamber in suitably close relation to the mouth piece, and by suitably proportioning and inclining the conduit between the chamber and the pump, the settling of dust in the conduit may be avoided, even though bends occur in the same. The liquid may be introduced at any point in the apparatus so long as it acts to absorb the dust and permit its being pumped out in suspension in the water.

In Figs. 2 and 4 I have shown my invention as applied to an apparatus in which the mixing chamber and pump are formed as a single device. In these figures the pump is of the diaphragm type having a relatively large stroke. In this construction, *i* is the suction pipe, *k* the suction valve, *l* the pump chamber which also serves as a mixing space, *m* the diaphragm, *n* the pressure valve, *o* the piston rod, *p* the discharge opening, and *q* the jet-pipe. During the upward movement of the piston, air is drawn in through the suction pipe *i*, and liquid through the jet-pipe *q*, the air accumulating in the top part of the chamber *l*. When the piston moves downwardly it first expels, through the pressure valve *n* and outlet *p*, the air admitted during the previous stroke, and then expels a quantity of liquid corresponding to that taken in during the upward movements thereof. In order to prevent air from gathering, during the last part of the stroke, in the upper annular space surrounding the diaphragm, a special annular valve *r* is preferably arranged at the top of said space, said valve acting during the downward stroke to permit the air to be driven out of the pump chamber so that the latter will be perfectly free of clearance. The annular valve *r* may be replaced by a number of small valves if desired, or the gathering of the air in the pump chamber may be avoided by any other suitable means. In some instances it may be desirable to omit the pressure valve *n* in the piston, although it is desirable to retain this in most cases as it softens the blow of the piston when the latter strikes the water on its downward movement. The outlet *p* is preferably placed sufficiently above the top of the valve *r* to cause a submersion of the valve even when the diaphragm is in its lowest position. The suction pipe *i* is preferably formed with a U-shaped bend immediately below the pump, so that the liquid leaking through the suction valve *k* will gather therein and be drawn up into the pump again as soon as it fills the lower curve of the bend.

Instead of using a jet-pipe *q*, any other suitable means may be employed for introducing the fluid. In Fig. 3 I have shown a construction in which the fluid is introduced through holes at or near the seat of the valve *k* so that the seat and valve are hit by the jets and thus constantly rinsed. In this construction a continuous chamber *t* is provided which encircles the pump chamber, water being introduced into such chamber through an opening *u*. Any other suitable means may be substituted for producing this result.

The liquid used may be taken from any source, such for instance, as a water supply pipe, or from a tank, from which it may flow by gravity, or be drawn up by suction of the pump. The quantity of liquid taken may be controlled by a valve or cock, and may be adjusted according to the quantity of dust contained in the air.

The air and liquid may be discharged separately from the pump by providing a suitable outlet for the air above the highest level of the liquid, the discharge pipe *p* being in this case preferably arranged below the highest level of the liquid, and is directed downwardly and then upwardly so that its outer end is at such level.

In Fig. 4 I have illustrated a complete apparatus for practising my invention, showing the connection of my device with a suction nozzle and a source of liquid supply. In this figure *v* is a pump constructed in accordance with Fig. 2, *w* is a water tank connected with the water inlet, *q*, *x* is a valve controlling the water supply, and *y* is a suction mouth piece of ordinary type connected to the inlet pipe *i* by a flexible tube or conduit *z*. The pipe *p* is shown as connected with a suitable egress tube which leads to a sewer, purifier or the like. Similar connections are used with the device shown in Fig. 1.

In the drawings I have shown by way of example, my invention as applying to single acting piston pumps, but it is evident that double acting pumps of any description or other suction devices may be employed in lieu of those shown.

What I claim as my invention and desire to secure by Letters Patent is:—

1. In dust extracting apparatus, a suction mouth-piece, means for drawing dust and air therethrough, means for introducing substantially continuously into such apparatus a relatively large quantity of liquid sufficient to slime the dust, but insufficient to break the vacuum, and means for so conducting said air and liquid through the apparatus that they will be effectively commingled, said apparatus being adapted to effect a substantially continuous discharge of the dust laden liquid to remove the dust from the apparatus.

2. In dust extracting apparatus, a suction mouth-piece, a pump for drawing the dust and air therethrough, means for introducing substantially continuously into such apparatus a relatively large quantity of liquid sufficient to slime the dust, but insufficient to break the vacuum, and means for so conducting said air and liquid through the pump that they will be effectively commingled, said pump being adapted to effect a substantially continuous discharge of the dust laden liquid to remove the dust from the apparatus.

3. In dust extracting apparatus, a suction mouth-piece, a pump for drawing dust and air therethrough, means for introducing substantially continuously into such apparatus in advance of the pump outlet a relatively large quantity of liquid sufficient to slime the dust, but insufficient to break the vacuum, and means for so conducting said air and liquid through the pump that they will be effectively commingled, said pump being adapted to effect a substantially continuous discharge of the dust laden liquid to remove the dust from the apparatus.

4. In dust extracting apparatus, a suction mouth-piece, a pump for drawing air and dust therethrough, a mixing chamber in advance of the pump outlet, and means for introducing substantially continuously into such chamber a relatively large quantity of liquid sufficient to slime the dust, but insufficient to break the vacuum, said chamber having means for effectively commingling said air and liquid, said pump being adapted to effect a substantially continuous discharge of the dust laden liquid to remove the dust from the apparatus.

5. In dust extracting apparatus, a suction mouth-piece, a reciprocating pump for drawing air and dust therethrough, and means for sprinkling liquid directly against a valve seat of said pump whereby to rinse the latter and to mix the dust with the liquid.

6. In dust extracting apparatus, a pump having a diaphragm, a chamber in which said diaphragm works, said chamber being of larger diameter than the diaphragm so as to provide a space between the latter and the walls of the chamber, and a valve for permitting the escape of air from the upper portion of said chamber adapted to open when such diaphragm is depressed whereby to eliminate the effects of clearance.

7. In dust extracting apparatus, a pump having a diaphragm, inlet and outlet valves, a chamber between said valves, means for introducing a liquid between said valves to absorb the dust passing through said pump, and a special valve at the top of said chamber to permit the escape of air from the upper portion thereof so as to eliminate the clearance space.

8. In a dust extracting apparatus, a suction mouth piece, means for drawing dust and air therethrough, means for absorbing dust drawn into the apparatus in a relatively large quantity of liquid in advance of the outlet of said dust and air drawing means, and means for so conducting said air and liquid through the apparatus that they will be effectively commingled, said apparatus being adapted to effect a continuous discharge of said dust laden liquid to remove the absorbed dust from the apparatus.

9. In dust extracting apparatus, a suction mouth piece, means for drawing dust and air therethrough, means for introducing substantially continuously into such apparatus a relatively large quantity of liquid sufficient to slime the dust, but insufficient to break the vacuum, and a chamber constructed to effectively commingle the air and liquid in which said fluid and air are introduced, said chamber having an outlet, and the apparatus being arranged to draw both the liquid and air through said outlet.

10. In dust extracting apparatus, a pump for drawing dust and air therethrough, means for introducing substantially continuously into the apparatus a relatively large quantity of liquid sufficient to slime the dust carried by said air into said pump, but insufficient to break the vacuum, such apparatus being adapted to maintain a body of liquid through which the air is compelled to rise before it is discharged by the pump, said pump having means for substantially continuously discharging the dust laden liquid out of the apparatus.

11. In a dust extracting apparatus, a pump for drawing dust and air therethrough, and means for introducing substantially continuously into the apparatus a relatively large quantity of liquid to absorb the dust drawn into the said apparatus, said apparatus being adapted to maintain a body of liquid through which the air is compelled to pass and to effect a continuous discharge of the dust laden liquid to remove the absorbed dust from the apparatus.

12. In a dust extracting apparatus, a pump for drawing dust and air therethrough, means for introducing liquid substantially continuously into the apparatus, such apparatus containing a chamber positioned to maintain a body of liquid and having inlet and outlet ports arranged to compel the passage of the air through the body of liquid to absorb dust drawn into the apparatus before it is discharged by the pump, such pump being adapted to effect a continuous discharge of the dust laden liquid to remove the absorbed dust from the apparatus.

Signed at Copenhagen, Denmark, this 30th day of September, 1915.

FREDERIK VILHELM SCHIÖDT.